Figure 1:
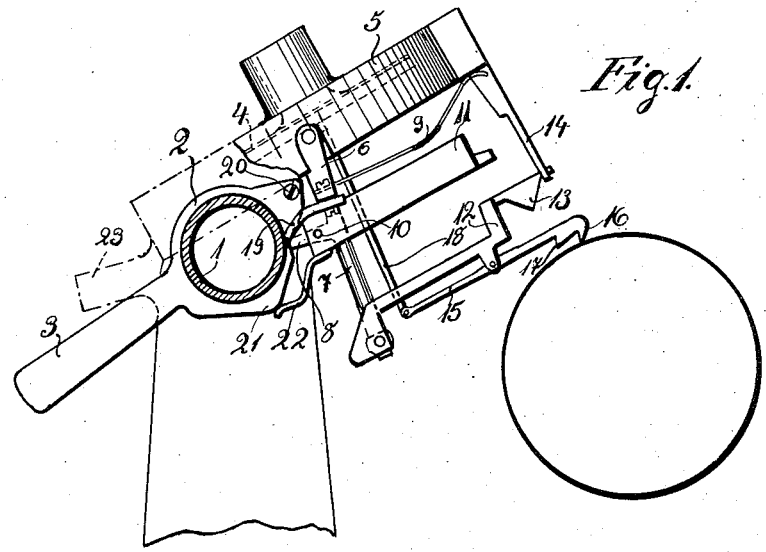

C. LINDSTROM.
TALKING MACHINE.
APPLICATION FILED MAR. 11, 1910.

1,067,530.

Patented July 15, 1913.

2 SHEETS—SHEET 1.

Witnesses:
Robert H. Kammler
Carl L. Choate

Inventor:
Carl Lindström,
by Emery Booth
Attys.

C. LINDSTRÖM.
TALKING MACHINE.
APPLICATION FILED MAR. 11, 1910.

1,067,530.

Patented July 15, 1913.
2 SHEETS—SHEET 2.

Witnesses:
Robert H. Kammler
Carl L. Choate

Inventor:
Carl Lindström,
by Emery & Booth
Attys.

UNITED STATES PATENT OFFICE.

CARL LINDSTRÖM, OF BERLIN, GERMANY.

TALKING-MACHINE.

1,067,530.	Specification of Letters Patent.	Patented July 15, 1913.

Application filed March 11, 1910. Serial No. 548,570.

*To all whom it may concern:*

Be it known that I, CARL LINDSTRÖM, a subject of the King of Sweden, and a resident of Grosse Frankfurterstrasse 137, Berlin, Germany, have invented a certain new and useful Improvement in or Relating to Talking-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to talking machines and has for its object to provide an improved arrangement of mechanism for changing the positions of the recording and reproducing points or needles especially suitable for use in connection with the single sound box of dictating machines and whereby the recording and reproduction of the sound are improved.

Dictating machines, as heretofore usually constructed, are objectionable in that the reproduction of the dictated matter is noticeably lacking in clearness. This is mainly due to the construction of that portion of the recording mechanism adapted for changing the positions of the recording and reproducing points or needles, these points or needles being commonly pressed against the record cylinder with the same degree of pressure for both recording and reproducing.

A further defect of the common forms of construction consists in the fact that both the points or needles are arranged directly on the sound diaphragm of the talking machine so that for effecting the various adjustments, namely putting into action the reproducing point or needle, putting both the points or needles entirely out of action, and finally putting the recording point or needle into action, a movement of the whole sound box in a plane at right angles to the record cylinder is necessary. This construction is attended with the draw-back that uncertainty in the reception of sound is caused through the sound box being bodily movable in this transverse plane, apart from the fact that the transmission of the sound waves both in the act of recording and reproducing thereof is imperfect owing to the recording point being mounted directly on the diaphragm. Moreover, with this arrangement, contrary to the necessary and natural one, according to which the recording points or needles must be positioned in the center of the diaphragm, they are positioned eccentrically to the center of the diaphragm.

Now the present invention is, as its principal object, directed toward obviating the aforesaid defects and this is accomplished by so arranging the sound box together with the diaphragm, that it shall be unnecessary to change its position in a plane at a right angle to the record cylinder and shall only be adapted to perform the obviously necessary movements in a direction parallel to the record cylinder. The shifting of the points or needles into the recording, inoperative, and reproducing positions respectively is effected in the embodiment of the invention shown therein by adjustment of the recording and reproducing device while the position of the diaphragm itself is not changed. The construction of the recording and reproducing device is such that the two points or needles for recording and reproducing respectively, are mounted on a lever mechanism attached to the central point of the diaphragm. In this way the usual and objectionable eccentric arrangement of the points or needles is obviated. With the object of avoiding horizontal or lateral swinging movement provision is further made for rigidly holding the recording point or needle against such movement when acting on the record cylinder thereby enabling it to respond to the action of the sound-waves effectually in a vertical direction and while so doing to trace as straight a record-line as possible. On the other hand, during reproduction of the record the point or needle must be loosely held while being pressed against the record cylinder so that it may follow both the depressions and the lateral deviations of the sound scores or record lines. It is furthermore essential that the pressure shall be inoperative during the recording operation and on the contrary operative during the reproducing operation.

One construction of mechanism for changing the positions of the recording or reproducing points or needles embodying the invention is illustrated in the accompanying drawings.

Figure 2:
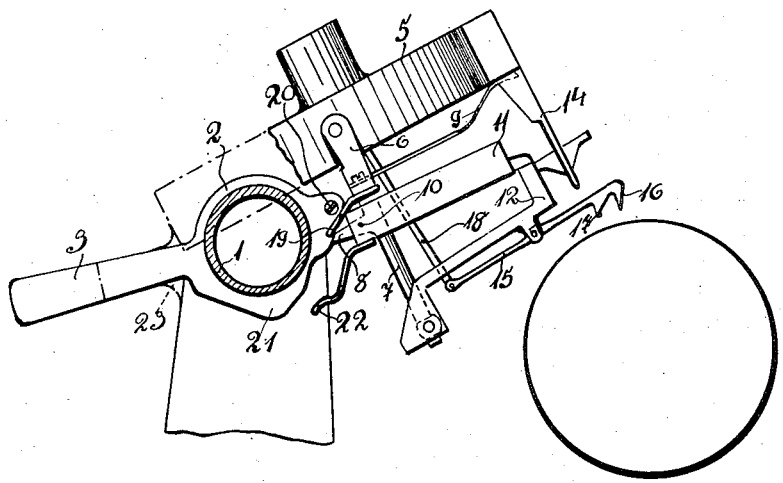
Figure 3:
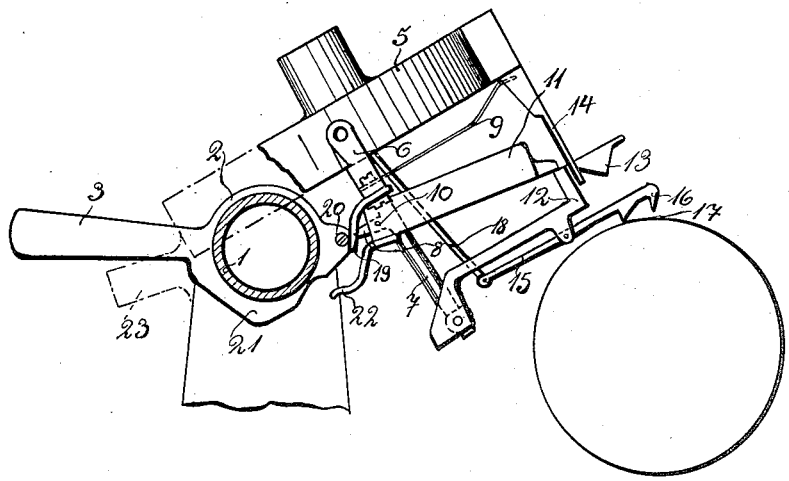
Figure 4:
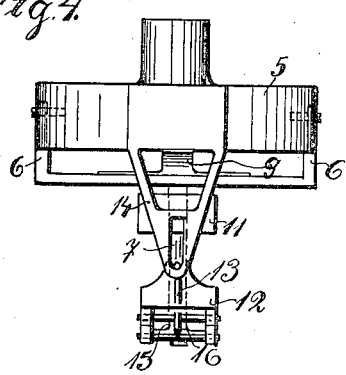

Figures 1 to 3 of such drawings are side elevations of the mechanism showing it in different positions. Fig. 1 shows the point or needle in the receiving or recording position; Fig. 2 the middle position in which both recording and reproducing points are raised clear of the record cylinder, and Fig. 3 the point or needle in reproducing position. Fig. 4 is a front elevation of the mechanism.

Mounted on a tubular guide 1 is a cam disk 2 furnished with a handle 3. Pivotally attached to the box 5, serving to hold the diaphragm 4, is a yoke 6 which, at its middle part, is provided with a downward extension in the form of a pin or post on which is mounted to turn a sleeve 7. A projection 8 formed integral with the sleeve 7 is caused to bear against the cam disk 2 by a blade spring 9, and a weight 11 is pivotally attached to the projection 8 at a point 10. At its lower end the sleeve 7 has pivoted to it a dog 12 the front end of which, is of less width than, the other part and projects through a slot in a guide plate 14 fixed to the box 5. Pivoted to the dog 12 is a needle supporting lever 15 carrying at one end the recording and reproducing points or needles 16 and 17 for the recording and reproducing operations respectively, and connected at its other end to the diaphragm 4 by a link 18. Fixed to the yoke 6 is a catch 19 adapted to be depressed by a pin 20 provided on the cam disk 2.

In the recording position, Fig. 1, the handle 3 is pressed downward. In this position the spring 9 forces the projection 8 into a recess in the cam disk 2, by which means the sleeve 7 is positively guided, that is to say, such sleeve and attached members, namely the dog 12 and lever 15 with the two points or needles 16 and 17, are prevented from oscillating to the right and left while free to do so in an upward and downward direction. At the same time a projection 21 on the cam disk presses against an extension piece 22 secured to the weight 11 thereby causing the latter to be held in a raised position as shown, Fig. 1. In this position the recording point or needle 16 is accordingly pressed comparatively lightly against the record cylinder while being however effectually held against lateral movement.

To lift both points 16 and 17 clear of the record cylinder the handle 3 is raised till it comes flush or on a level with an abutment or projection 23, see Fig. 2, thereby causing the cam disk projection 21 to release the weight 11, which then falls and rests on the dog 12, see Fig. 2. At the same time the cam disk 2 bears against the projection 8 and pushes the dog 12 forward, thereby causing it, along with the points or needles 16 and 17, to be raised by the inclined face or lug 13 of the narrow part of the dog riding at the end of the slot upon the guide 14. No special recess in the cam disk 2 is necessary for this middle position, as the weight 11 presses the part 13 firmly into the guide 14.

For the reproducing position the handle 3 is pressed upwardly to the full extent beyond the abutment or projection 23, see Fig. 3 thereby causing the dog 12 to be pushed still farther forward through the slot of the guide and the reproducing point or needle 17 to be brought into contact with the record cylinder. At the same time the pin 20 presses down on the catch 19, so that the sleeve 7 on which the dog 12 is carried is free to oscillate to the right and left and thus enable the reproducing point or needle to follow the sound score or record line in a perfectly free and unhampered manner. In this position the weight 11 lies on the dog 12, its pressure thus causing the point or needle 17 to effectually follow the depressions in the sound scores or record lines.

Instead of the dog 12 being acted upon by the pressure of a weight obviously other means such as springs may be employed for this purpose.

What I claim is:—

1. In a dictating machine, a single sound box comprising a diaphragm, a lever provided at one end thereof with recording and reproducing needles and means for connecting said needles to the diaphragm and adjusting said needles including a lever-carrying dog longitudinally adjustable in a plane transversely of the sound box.

2. In a talking machine, a sound box comprising a diaphragm, a lever provided with a plurality of needles, a link connecting said lever to the diaphragm, a fulcrum member for said needles pivotally supported from said sound box and movable in a plane substantially parallel with said sound box and transversely thereof, and means to apply yielding pressure to one of said needles in operative position and to said fulcrum member when said needles are in inoperative position.

3. In a dictating machine, a fixed sound box, a diaphragm therein, a lever provided at one end thereof with recording and reproducing needles in relative juxtaposition and in substantially the same transverse plane of the diaphragm and means for connecting said needles to the center of said diaphragm and adjusting said needles including a lever-carrying dog longitudinally adjustable in a plane transversely of the diaphragm.

4. In a sound recording and reproducing machine, a sound box, a diaphragm, a needle carrying lever having a swinging connection with said diaphragm, a lever carrying dog having a swinging connection with said sound box, an angular adjusting lug on said dog, a positioning guide therefor, a pressure member pivotally secured to said sound box, a needle and pressure adjusting member, means for retaining said pressure member and needles in operative connection with said adjusting member, means, including said swinging connection for said dog, connecting said pressure member and needle lever with said needle adjusting member whereby said angular lug may be positioned in said guide to operatively position said needles respectively and nonoperatively position them, and to move said pressure member transversely of said box to cause said pressure member to be effective relative to said needle lever in a plurality of positions.

5. In a dictating machine, a sound box comprising a diaphragm, a lever provided at one end thereof with recording and reproducing needles in relative juxtaposition thereon and in substantially the same transverse plane of the diaphragm, a link connecting said lever to said diaphragm and movable with relation thereto, means for imparting movement to the needles in a plane substantially transverse of the sound box and means for holding the recording needle, when in use, rigidly against lateral movement thereof.

6. In a dictating machine, a sound box provided with a diaphragm, a needle lever, a fulcrum therefor, said lever provided at one end thereof and in relative juxtaposition thereon with recording and reproducing needles, a link connecting said needles to the diaphragm and movable with relation to the sound box, means for imparting such movement to the needles by changing the position of the fulcrum of said lever in a plane transverse to the axis of the sound record, means for exerting pressure upon the needle lever in the inoperative and reproducing positions.

7. In a talking machine, a sound box comprising a diaphragm, a lever provided at one end thereof and in relative juxtaposition thereon with recording and reproducing needles, a fulcrum for said lever, a link connecting said needles with the diaphragm, said needles and lever being movable transversely of the sound box, means for imparting said movement to the needles by changing the position of the fulcrum of said lever in a plane transverse to the axis of the sound box, and means permitting free lateral movement of the reproducing needle when in use.

8. In a dictating machine, a sound box comprising a diaphragm, a lever provided at one end thereof and in relative juxtaposition thereon with recording and reproducing needles, a fulcrum for said lever, a link connecting said needles with the diaphragm, said link and needles being movable transversely of the sound box, means for imparting such movement to said needles, means for yieldingly exerting pressure upon the fulcrum member in the inoperative and reproducing positions of the needles and means for withholding said pressure from said recording needle when said needle is in use.

9. In a dictating machine, a sound box comprising a diaphragm, a lever provided with recording and reproducing needles, a link connecting said lever to the diaphragm, said link and needles being movable transversely of the diaphragm, means for imparting such movement and means for holding said lever rigidly against lateral movement in the recording position and permitting free lateral movement thereof in the reproducing position.

10. A sound recording and reproducing machine comprising a sound box, a diaphragm, a yoke pivoted to said box and provided with a post, a movable member carried by said post, said movable member being provided with a projecting portion, a pressure member carried by said projection, a needle carrying lever movably secured to said movable member and connected with said diaphragm, an auxiliary needle positioning member, a guide carried by said box and means to adjustably position said needle lever.

11. In a talking machine, a sound box, a diaphragm, a needle carrying lever provided with a plurality of needles, said lever pivotally mounted on a dog, said dog movably secured to a post movably connected to the sound box, a sleeve on said post provided with a cam engaging projection, a handle provided with a cam adapted to engage said projection to position the needles.

12. A sound recording and reproducing machine comprising a sound box, a diaphragm, a yoke depending from said box and provided with a post, a pressure exerting member on said post, a needle positioning dog pivotally secured to said post, a lever provided with a sound recording and a sound reproducing point carried by said dog, and a cam lever adapted to position said post and thereby said needles relatively to the cylinder.

In testimony whereof I affix my signature in presence of two witnesses.

CARL LINDSTRÖM.

Witnesses:
 HENRY HASPER,
 WOLDEMAR HAUPT.